(12) United States Patent
Neurath et al.

(10) Patent No.: US 10,960,777 B2
(45) Date of Patent: Mar. 30, 2021

(54) ELECTRIC VEHICLE COMPONENT

(71) Applicant: Dr. Ing. h.c. F. Porsche Aktiengesellschaft, Stuttgart (DE)

(72) Inventors: Philipp Neurath, Leonberg (DE); Eduard Ewert, Karlsruhe (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 6 days.

(21) Appl. No.: 16/527,102

(22) Filed: Jul. 31, 2019

(65) Prior Publication Data
US 2020/0039366 A1 Feb. 6, 2020

(30) Foreign Application Priority Data
Jul. 31, 2018 (DE) .................. 10 2018 118 500.6

(51) Int. Cl.
*B60K 1/04* (2019.01)
*B60L 50/60* (2019.01)
*B60K 6/28* (2007.10)
*B62D 25/20* (2006.01)

(52) U.S. Cl.
CPC ............... *B60L 50/66* (2019.02); *B60K 1/04* (2013.01); *B60K 6/28* (2013.01); *B62D 25/20* (2013.01); *B60K 2001/0438* (2013.01); *B60Y 2200/92* (2013.01); *B60Y 2306/01* (2013.01); *B60Y 2400/112* (2013.01)

(58) Field of Classification Search
CPC ............... B60K 2001/0444; B60K 2028/006
USPC ................................. 180/68.5, 232
See application file for complete search history.

(56) References Cited

U.S. PATENT DOCUMENTS

| 5,476,151 | A | * | 12/1995 | Tsuchida | B60R 16/04 180/274 |
| 5,555,950 | A | * | 9/1996 | Harada | B60K 1/04 180/65.1 |
| 5,915,494 | A | * | 6/1999 | Matsumura | B60K 5/04 180/232 |
| 5,947,223 | A | * | 9/1999 | Rebmann | B60R 21/00 180/232 |

(Continued)

FOREIGN PATENT DOCUMENTS

| DE | 11 2015 001 437 | 12/2016 |
| DE | 11 2009 004 800 | 2/2018 |
| JP | 2013-082250 | 5/2013 |

OTHER PUBLICATIONS

German Office Action dated Jun. 14, 2018.

*Primary Examiner* — Jeffrey J Restifo
(74) *Attorney, Agent, or Firm* — Gerald E. Hespos; Michael J. Porco; Matthew T. Hespos

(57) ABSTRACT

An electric vehicle component (1) for an at least partially electrically driven motor vehicle (100) that has a drive device (2) with an electric drive unit (12) and a carrying unit (22) for fastening the drive unit (12) to a vehicle load-bearing structure (101). The electric vehicle component has a battery device (3) for supplying the drive unit (12) with electric energy. A run-on element (4) is arranged on the drive device (2) and is configured for running onto the battery device (3) in a targeted manner with a run-on geometry (14) in the case of an accident-induced movement of the drive unit (12) so that a punctiform and/or inhomogeneous loading situation of the battery device (3) is counteracted.

11 Claims, 2 Drawing Sheets

(56) References Cited

U.S. PATENT DOCUMENTS

| | | | | |
|---|---|---|---|---|
| 6,722,696 B2 * | 4/2004 | Sonomura | B60K 5/1216 | 180/232 |
| 6,827,168 B2 * | 12/2004 | Miyazaki | B60R 19/00 | 180/274 |
| 7,066,515 B2 * | 6/2006 | Pierce | B60R 19/00 | 180/68.5 |
| 7,070,015 B2 * | 7/2006 | Mathews | B60L 53/80 | 180/68.5 |
| 7,144,039 B2 * | 12/2006 | Kawasaki | B60K 1/04 | 280/784 |
| 7,393,016 B2 * | 7/2008 | Mitsui | B62D 25/08 | 180/232 |
| 7,568,755 B2 * | 8/2009 | Imada | B62D 21/152 | 296/187.11 |
| 7,669,688 B2 * | 3/2010 | Yamaguchi | B62D 21/155 | 180/312 |
| 7,717,207 B2 * | 5/2010 | Watanabe | B60L 50/66 | 180/68.5 |
| 7,886,861 B2 * | 2/2011 | Nozaki | B60L 50/66 | 180/232 |
| 8,037,960 B2 * | 10/2011 | Kiya | B60K 1/04 | 180/68.5 |
| 8,051,934 B2 * | 11/2011 | Kiya | B60K 1/04 | 180/68.5 |
| 8,585,128 B2 * | 11/2013 | Hoshino | B60K 1/04 | 296/187.05 |
| 8,646,792 B2 * | 2/2014 | Young | B62D 21/155 | 280/124.109 |
| 8,708,402 B2 * | 4/2014 | Saeki | B62D 21/157 | 296/187.12 |
| 8,739,910 B2 * | 6/2014 | Katayama | B62D 21/152 | 180/68.5 |
| 8,839,895 B2 * | 9/2014 | Kato | H01M 2/1083 | 180/68.5 |
| 8,863,877 B2 * | 10/2014 | Saeki | B60R 16/04 | 180/68.5 |
| 8,863,878 B2 * | 10/2014 | Shirooka | B60K 1/04 | 180/68.5 |
| 9,561,824 B2 * | 2/2017 | Tamaoki | B62D 21/02 | |
| 9,975,416 B2 * | 5/2018 | Hara | B62D 25/20 | |
| 9,987,912 B2 * | 6/2018 | Shinoda | B62D 25/2027 | |
| 10,093,183 B2 * | 10/2018 | Murata | B62D 21/152 | |
| 10,279,693 B2 * | 5/2019 | Shimizu | B60L 50/66 | |
| 10,322,757 B2 * | 6/2019 | Shimoda | B62D 21/157 | |
| 10,464,406 B2 * | 11/2019 | Kawabe | B60K 1/04 | |
| 10,589,790 B2 * | 3/2020 | Ayukawa | B62D 21/155 | |
| 10,611,230 B2 * | 4/2020 | Yokota | B62D 25/08 | |
| 10,654,367 B2 * | 5/2020 | Ichida | F16F 7/12 | |
| 10,766,348 B2 * | 9/2020 | Fukui | B62D 21/11 | |
| 2003/0089540 A1 * | 5/2003 | Koike | H01M 2/1055 | 180/68.5 |
| 2012/0006607 A1 * | 1/2012 | Ohashi | B60L 1/003 | 180/65.31 |

* cited by examiner

ELECTRIC VEHICLE COMPONENT

CROSS REFERENCE TO RELATED APPLICATION

This application claims priority under 35 USC 119 to German Patent Appl. No. 10 2018 118 500.6 filed on Jul. 31, 2018, the entire disclosure of which is incorporated herein by reference.

BACKGROUND

Field of the Invention

The invention relates to an electric vehicle component for an at least partially electrically driven motor vehicle having at least one drive device and at least one battery device.

Related Art

The traction battery of an electric vehicle is usually a component that is particularly critical in terms of deformation. Therefore, precautionary measures often are taken to protect the traction battery in the case of accidents. Other components of the vehicle also can be pushed onto the battery in an accident-induced manner.

Components of this type are, for example, the electric motor or the transmission. These components frequently are pressed onto the traction battery in the case of a crash. Thus, an impermissible loading situation can occur on the modules and/or cells of the battery.

It is therefore an object of the invention to improve an accident behavior of this type of an at least partially electrically driven motor vehicle. In particular, the loading situation of the battery device of a drive unit is to be improved in the case of an accident-induced movement.

Further advantages and features of the invention result from the general description and the description of the exemplary embodiments.

SUMMARY

The electric vehicle component of the invention is provided for an at least partially electrically driven motor vehicle, such as an electric vehicle and/or hybrid vehicle. The electric vehicle component comprises at least one drive device with at least one electric drive unit and at least one carrying unit for fastening the drive unit to a vehicle load-bearing structure. The electric vehicle component comprises at least one battery device for supplying the drive unit with electric energy. At least one run-on element is arranged on the drive device. The run-on element is suitable and configured for running onto the battery device in a targeted manner with at least one run-on geometry in the case of an accident-induced movement of the drive unit. As a result, a punctiform and/or inhomogeneous loading of the battery device can be counteracted. The run-on element comprises at least one run-on geometry.

The electric vehicle component according to the invention affords many advantages. The run-on element with the run-on geometry affords one considerable advantage. As a result, the drive unit can run onto the battery device in the case of a crash so that a particularly favorable and/or homogeneous load distribution results. In this way, unfavorable and/or critical deformations of the battery device and damage of the modules and/or cells are avoided effectively or are at least reduced to a permissible level. The invention can particularly advantageously be used in the case of an asymmetrically configured drive unit, since this would collide with the battery device on one side and/or in a punctiform manner in the case of an accident-induced movement. Loading of this type can be counteracted in an uncomplicated and reliable manner by way of the invention.

The run-on geometry may be adapted to an outer contour of the battery device. The run-on geometry may be adapted to an outer contour of the battery device, which outer contour is directed toward the drive unit in an operational arrangement. As a result, an advantageous load distribution can be achieved when the run-on geometry comes into contact with the battery device. For example, the run-on geometry lies opposite the outer contour and preferably behind the outer contour of the battery device in the forward driving direction. In particular, the run-on geometry and the battery device have complementary outer contours. In particular, the outer contours may be configured so that running on over the full surface area is achieved. In particular, the run-on geometry provides a more symmetrical area for running onto the battery device than the outer contour of the drive device.

The run-on geometry can be supported over a full surface area on the battery device in an accident-induced movement of the drive unit. In particular, the run-on geometry can bear against the battery device over the full surface area to avoid unfavorable loading. In particular, the run-on geometry provides a larger surface area for running onto the battery device than the outer contour of the drive unit. To this end, the run-on geometry can have a planar outer side, and the battery device also can have a planar outer contour at least in sections.

The run-on element may be arranged on the carrying unit. In particular, the carrying unit may comprise at least one engine mount or may be configured as an engine mount. The run-on element may be arranged on the engine mount. This provides a particularly advantageous accommodation of the run-on element and can be implemented in a structurally uncomplicated manner. In particular, the run-on element can be fastened to the carrying unit and to the engine mount.

The carrying unit may comprise at least one longitudinal carrier or may be configured as a longitudinal carrier. The run-on element may be arranged on the longitudinal carrier. In particular, the run-on element may be fastened to the longitudinal carrier.

The run-on element may be arranged at least partially on an operational underside of the carrying unit and may be fastened there. A refinement of this type, for example in combination with an underfloor battery, makes particularly advantageous running on a possibility in the case of a crash. In particular, the run-on element is arranged on an outer side of the carrying unit, and the outer side is directed toward the battery device. Other suitable positions of the run-on element on the carrying unit or on other suitable components of the drive device are also possible. The run-on element may be arranged at least partially on the drive unit and, for example, on an electric motor and/or on a transmission.

The carrying unit can comprise at least two carrier elements. In particular, in each case at least one run-on element is arranged on the carrier elements. The run-on element may connect the carrier elements. In particular, the at least one run-on element is fastened to at least two carrier elements. In particular, the run-on element extends from a carrier element as far as another carrier element. It is also possible that the run-on element is arranged at least partially between the carrier elements. The carrier elements may be configured as longitudinal carriers. For example, one carrier element may be on the right side and another carrier element may be on the left side of a center of the drive unit. Refinements of this type can make an advantageous crash behavior possible.

The battery device may comprise at least one battery unit and at least one battery frame for fastening the battery unit to a vehicle load-bearing structure. The run-on element may run at least partially onto the battery frame with the run-on geometry in the case of an accident-induced movement of the drive unit. As a result, advantageous support of the drive unit protection of the battery are achieved.

The battery frame can be configured as a housing or as another type of receiving structure, or can be part of a receiving structure of this type. The battery frame preferably surrounds the battery unit on at least one side that is directed toward the drive unit in an operational arrangement.

The battery device may be configured as a traction battery and/or as a high voltage battery, or comprises at least one battery of this type. The battery unit may comprise at least one battery module having a plurality of battery cells.

The drive unit and the battery unit may be fastened independently of one another to the vehicle load-bearing structure. The drive unit may be fastened via the load-bearing structure and the battery unit, in particular via the battery frame, to the vehicle load-bearing structure.

The battery device may be an underfloor battery. According to the invention, an underbody battery also is considered to be an underfloor battery. Particularly safe running on in the case of a crash can thus be achieved by way of the invention. The battery device can be configured as another design of a traction battery for an at least partially electrically operated motor vehicle.

The battery device may be in the region of a vehicle center and/or below a passenger compartment and in an underbody of the motor vehicle. In particular, the battery device may be arranged in front of the rear axle and/or the rear wheels in the forward driving direction. In particular, the battery device may be behind the front axle and/or the front wheels in the forward driving direction. In particular, the battery device is arranged between the front axle and the rear axle. Other positions of the battery device are also possible.

In all refinements, the drive device may be at least partially or completely behind the battery device in the vehicle longitudinal direction or forward driving direction. In a refinement of this type, the invention can be used advantageously to avoid accident-induced deformations of the battery. The drive device and the battery device may be arranged substantially directly next to one another. In particular, the drive unit via the carrying unit and the battery unit via the battery frame may be substantially directly next to one another in the vehicle longitudinal direction, with the drive unit being behind the battery unit in the vehicle longitudinal direction.

The drive device and the battery device may be in a rear region of the electric vehicle component and/or the motor vehicle. In particular, the electric vehicle component may be a rear region of the motor vehicle or may at least comprise a rear region of this type. In particular, the electric vehicle component comprises at least one rear drive and/or at least one rear axle and/or at least one rear axle suspension system and, for example, a subframe or the like. In particular, the electric vehicle component is suitable and configured for use in a rear region of a motor vehicle.

The drive device provides at least one rear drive or is configured as a rear drive of this type. In particular, the drive unit is assigned at least to the rear wheels and/or the rear axle. In particular, the drive device is arranged in the region of a rear axle and, for example, behind a rear axle in the forward driving direction. The rear axle can extend at least partially next to and/or above and/or below the drive device. In particular, the drive unit is arranged in the region of a subframe for the rear wheels. In particular, the battery device is arranged in front of a rear axle in the forward driving direction.

Accident-induced movement relates to a rear crash or a rear impact. In particular, the run-on element is suitable and configured for an accident-induced movement so that the drive device is pushed substantially forward or in the forward driving direction. This refinement provides particularly advantageous protection of the battery device.

The run-on element may be spaced apart from the battery device in an operational state before the accident-induced movement. In particular, the drive device and the battery device may be spaced apart from one another. In particular, the run-on element and the battery device are not fastened to one another. The run-on element and the battery device need not be in contact with one another. In particular, at least the run-on geometry of the run-on element may be spaced from the battery device. In particular, the run-on element is arranged to cover a distance in the case of an accident-induced movement before it runs onto the battery device.

The drive unit may comprise at least one electric machine and, for example, an electric motor. In particular, the drive unit comprises at least one transmission. The carrying unit may an engine mount or may comprise at least one engine mount.

The run-on element may have a wedge-shape with a ramp-like cross section. Other suitable shapes or cross sections are also possible.

In particular, the run-on element may be suitable and configured for being supported on the battery device by means of the run-on geometry that can bear against the battery device in the case of an accident-induced movement of the drive unit. In particular, the run-on element is suitable and configured for supporting the drive unit homogeneously on the battery device by means of the run-on geometry in a targeted manner in the case of an accident-induced movement. The run-on element is suitable and configured for coming into contact first of all or temporally before an outer contour of the drive unit by way of its run-on geometry with the battery unit in the case of an accident-induced movement of the drive unit. It is possible that the drive unit has an outer contour and, for example, an inhomogeneous and/or asymmetrical outer contour.

The vehicle load-bearing structure can be provided, for example, by way of a vehicle body and/or a vehicle shell and/or a chassis and/or another suitable load-bearing structure of a motor vehicle.

The applicant reserves the right to claim an at least partially electrically driven motor vehicle which comprises at least one electric vehicle component as has been described above. A motor vehicle of this type provides a particularly safe crash behavior. The motor vehicle is, in particular, an electric vehicle or a hybrid vehicle.

Further advantages and features of the invention result from the exemplary embodiments that will be described in the following text with reference to the appended figures.

DETAILED DESCRIPTION

Figure 1:
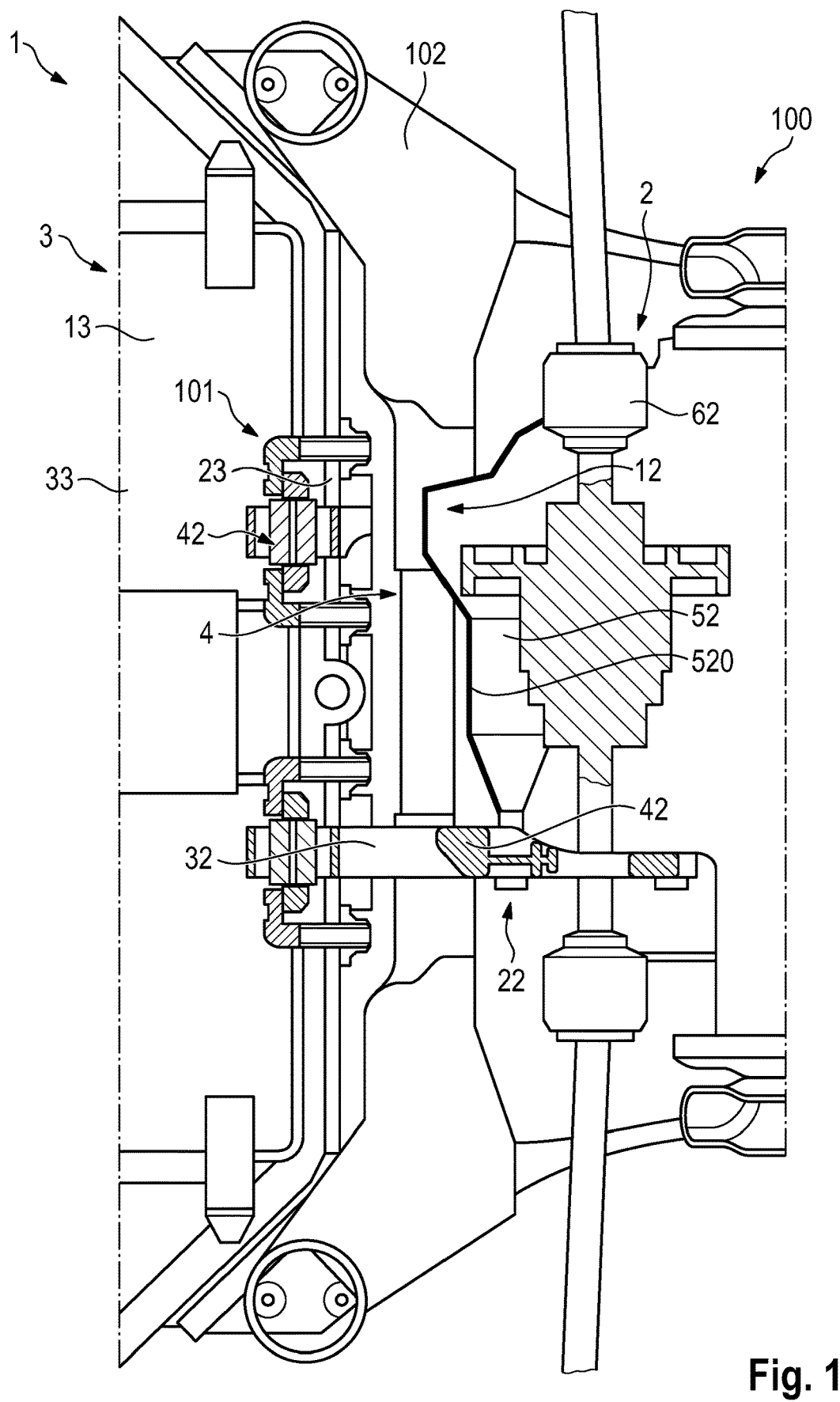
FIG. 1 shows a purely diagrammatic illustration of an electric vehicle component according to the invention in a partially sectioned plan view.

FIG. 1 shows an electric vehicle component 1 according to the invention which is arranged here in a rear region of a motor vehicle 100. The vehicle component 1 can also comprise the rear region which is shown here. The rear region comprises, for example, a subframe 102 for the rear wheels and/or the rear axle. The motor vehicle 100 is at least partially electrically driven and is, for example, an electric vehicle.

The battery component 1 comprises a drive device 2 having a drive unit 12 which is fastened via a carrying unit 22 to a vehicle load-bearing structure 101 (not shown in greater detail here) of the motor vehicle 100. The drive unit 12 comprises, for example, an electric machine 52 or an electric motor and a transmission 62. Here, the carrying unit 22 provides an engine mount for the electric machine 52. To this end, the carrying unit 22 here comprises two carrier elements 42 which are configured, for example, as longitudinal carriers 32.

The electric vehicle component 1 comprises a battery device 3 which serves as a traction battery for energy supply of the drive unit 12 and is configured here as an underfloor battery 33. The battery device 3 comprises a battery unit 13 and a battery frame 23 for fastening the battery unit 13 to the vehicle 100. Here, the battery frame 23 also provides a housing for the battery unit 13. The battery unit 13 has a plurality of battery modules (not visible here) which are equipped in each case with a plurality of battery cells.

Here, the drive unit 12 has an inhomogeneous and/or asymmetrical contour 520 on the outer side of the electric machine 52 and/or on the drive housing. For improved visibility, the contour 520 is highlighted here by way of bold lining.

Here, the drive unit 12 and the battery unit 13 are arranged directly next to one another in the vehicle longitudinal direction via the carrying unit 22 and the battery frame 23, respectively. Here, the drive unit 12 is arranged behind the battery device 3 in the forward driving direction.

As a result of said arrangement, in the case of a rear impact or rear crash, the drive unit 12 would be displaced forward in the vehicle longitudinal direction and, as a result, would be pressed against the battery device 3. As a result of the asymmetrical configuration of the drive unit 12 and, in particular, as a result of the contour 520, the battery device 3 would be loaded locally and on one side and/or in a punctiform manner here. As a result, an impermissible loading situation on the modules and/or battery cells would occur.

In order to counteract loading situations of this type, the electric vehicle component 1 comprises a run-on element 4 having a run-on geometry 14. The run-on element 4 is fastened to the carrying unit 22 (not visible in FIG. 1).

Figure 2:
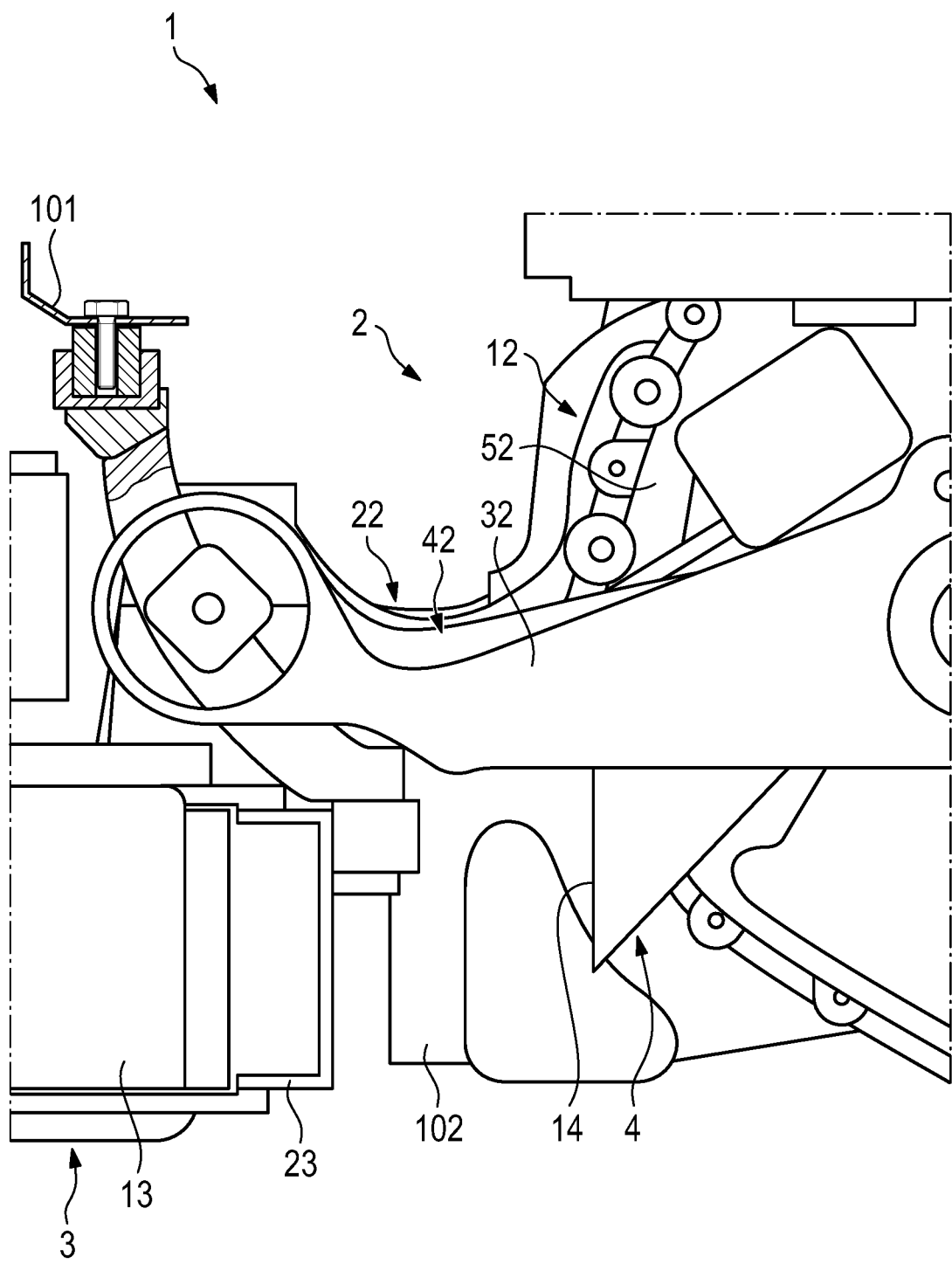
FIG. 2 shows a detailed illustration of the electric vehicle component in a partially sectioned side view.

FIG. 2 shows the run-on element 4 and its run-on geometry 14 in greater detail. Here, FIG. 2 shows a section through the electric vehicle component 1 in the region of the carrier element 42 in a side view.

As a result of the movement of the drive unit 12 which occurs in the case of a rear impact, the run-on element 4 is displaced in the direction of the battery device 3 here. Here, the run-on element 4 is arranged in such a way that it runs with the run-on geometry 14 onto the battery frame 23. As a result, the moved drive unit 12 can be supported via the run-on geometry 14 on the battery frame 23 in such a way that particularly homogeneous loading acts on the battery device 3.

The asymmetrical contour 520 therefore does not come into contact, or at least does not come into contact temporally before the run-on geometry, with the battery device 3. As a result, an unfavorable deformation of the battery modules and/or battery cells is effectively avoided or is at least reduced to a permissible level.

The run-on geometry is configured to bear over the full surface area against an outer contour of the battery frame 23. As a result, a particularly extensive bearing surface area for supporting purposes is achieved, and one-sided and/or punctiform loads are avoided.

LIST OF DESIGNATIONS

1 Electric vehicle component
2 Drive device
3 Battery device
4 Run-on element
12 Drive unit
13 Battery unit
14 Run-on geometry
22 Carrying unit
23 Battery frame
32 Longitudinal carrier
33 Underfloor battery
42 Carrier element
52 Electric machine
62 Transmission
100 Motor vehicle
101 Vehicle load-bearing structure
102 Subframe
520 Contour

What is claimed is:

1. An electric vehicle component for an at least partially electrically driven motor vehicle, comprising at least one drive device with at least one electric drive unit and at least one carrying unit for fastening the drive unit to a vehicle load-bearing structure, and comprising at least one battery device for supplying the drive unit with electric energy, comprising:
    at least one run-on element arranged on the drive device between the drive device and the at least one battery device and having a contour facing an outer contour of the battery, the run-on element being configured to remain positioned between the drive device and the at least one battery device and bearing on the outer contour of the battery device in a targeted manner in response to an accident-induced movement of the drive unit towards the at least one battery device to prevent a punctiform or inhomogeneous loading situation of the drive device on the at least one battery device.

2. The electric vehicle component of claim 1, the run-on is configured to be supported over a full surface area on the battery device in the case of an accident-induced movement of the drive unit.

3. The electric vehicle component of claim 1, wherein the run-on element is arranged on the carrying unit.

4. The electric vehicle component of claim 1, wherein the carrying unit comprises at least one longitudinal carrier, and the run-on element is arranged on the longitudinal carrier.

5. The electric vehicle component of claim 1, wherein the run-on element is arranged on an operational underside of the carrying unit.

6. The electric vehicle component of claim 1, wherein the carrying unit comprises at least two carrier elements, the at least one run-on element being arranged on the carrier elements and connecting the carrier elements.

7. The electric vehicle component of claim 1, wherein the battery device has at least one battery unit and at least one battery frame for fastening the battery unit to a vehicle load-bearing structure, and the run-on element running onto the battery frame in the case of an accident-induced movement of the drive unit.

8. The electric vehicle component of claim 1, wherein the battery device is an underfloor battery.

9. The electric vehicle component of claim 1, wherein the drive device is arranged behind the battery device in a longitudinal and forward driving direction of the vehicle.

10. The electric vehicle component of claim 1, wherein the accident-induced movement relating to a rear crash.

11. The electric vehicle component of claim 1, wherein the run-on element is spaced from the battery device in an operational state before the accident-induced movement.

\* \* \* \* \*